(12) United States Patent
May

(10) Patent No.: US 12,069,187 B2
(45) Date of Patent: Aug. 20, 2024

(54) SYSTEMS AND METHODS FOR POSTURE CHECKING ACROSS LOCAL NETWORK ZONE ZTNA CONTROL

(71) Applicant: Fortinet, Inc., Sunnyvale, CA (US)

(72) Inventor: Robert A. May, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 505 days.

(21) Appl. No.: 17/396,960

(22) Filed: Aug. 9, 2021

(65) Prior Publication Data

US 2023/0038058 A1 Feb. 9, 2023

(51) Int. Cl.
*H04L 9/32* (2006.01)
*H04L 9/40* (2022.01)

(52) U.S. Cl.
CPC ............ *H04L 9/3263* (2013.01); *H04L 63/10* (2013.01)

(58) Field of Classification Search
CPC ... H04L 9/3263; H04L 63/10; H04L 63/0209; H04L 63/0823
See application file for complete search history.

(56) References Cited

U.S. PATENT DOCUMENTS

| | | | | |
|---|---|---|---|---|
| 9,294,468 B1* | 3/2016 | Kilbourn | ............... | H04L 9/3263 |
| 9,350,556 B1* | 5/2016 | Taly | ................... | H04L 63/0823 |
| 10,277,406 B1* | 4/2019 | Veladanda | ............ | H04L 9/0825 |
| 2003/0233543 A1* | 12/2003 | Nagaratnam | ....... | G06F 21/6245 |
| | | | | 713/157 |
| 2004/0144840 A1* | 7/2004 | Lee | .................. | G06Q 20/40975 |
| | | | | 235/380 |
| 2007/0234417 A1* | 10/2007 | Blakley, III | ........ | H04L 63/0281 |
| | | | | 726/12 |
| 2011/0145565 A1* | 6/2011 | Kol | ........................ | H04L 51/00 |
| | | | | 713/170 |
| 2013/0036303 A1* | 2/2013 | Himawan | ............. | H04L 9/3268 |
| | | | | 713/158 |
| 2013/0159703 A1* | 6/2013 | Himawan | ........... | H04L 63/0823 |
| | | | | 713/156 |
| 2013/0312079 A1* | 11/2013 | McCallum | ............ | G06F 21/335 |
| | | | | 726/10 |
| 2013/0318343 A1* | 11/2013 | Bjarnason | ........... | H04L 41/0809 |
| | | | | 713/157 |
| 2014/0068251 A1* | 3/2014 | Ignaci | ..................... | H04L 9/006 |
| | | | | 713/158 |
| 2015/0372824 A1* | 12/2015 | Himawan | ........... | H04L 63/0823 |
| | | | | 713/156 |
| 2022/0141210 A1* | 5/2022 | Tylik | ................... | G06F 9/45558 |
| | | | | 713/157 |
| 2022/0303264 A1* | 9/2022 | Begun | ................. | G06F 9/45558 |
| 2023/0336549 A1* | 10/2023 | Williams | ............... | H04L 63/083 |

* cited by examiner

*Primary Examiner* — Michael R Vaughan
(74) *Attorney, Agent, or Firm* — Jaffery Watson Hamilton & DeSanctis LLP

(57) ABSTRACT

Systems, devices, and methods are discussed for providing ZTNA control across multiple related, but independently provisioned networks.

25 Claims, 5 Drawing Sheets

SYSTEMS AND METHODS FOR POSTURE CHECKING ACROSS LOCAL NETWORK ZONE ZTNA CONTROL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to securing network environments, and more particularly to systems and methods for providing ZTNA control across multiple related, but independently provisioned networks.

BACKGROUND

Zero trust network access (ZTNA) is used to identify network elements and/or operations that are allowed within a given network environment, and to allow only those identified network elements and/or operations to operate in the network. Such an approach offers enhanced ability to secure a network environment from malicious attacks by disallowing any activity from a non-identified source. While such enhanced security is desirable, the problem is that it does not allow access to sources outside of the network protected by the ZTNA policy where such access would be beneficial.

Thus, there exists a need in the art for more advanced approaches, devices and systems for allowing network access while leaving the ZTNA policy intact.

SUMMARY

Various embodiments provide systems and methods for providing ZTNA control across multiple related, but independently provisioned networks.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
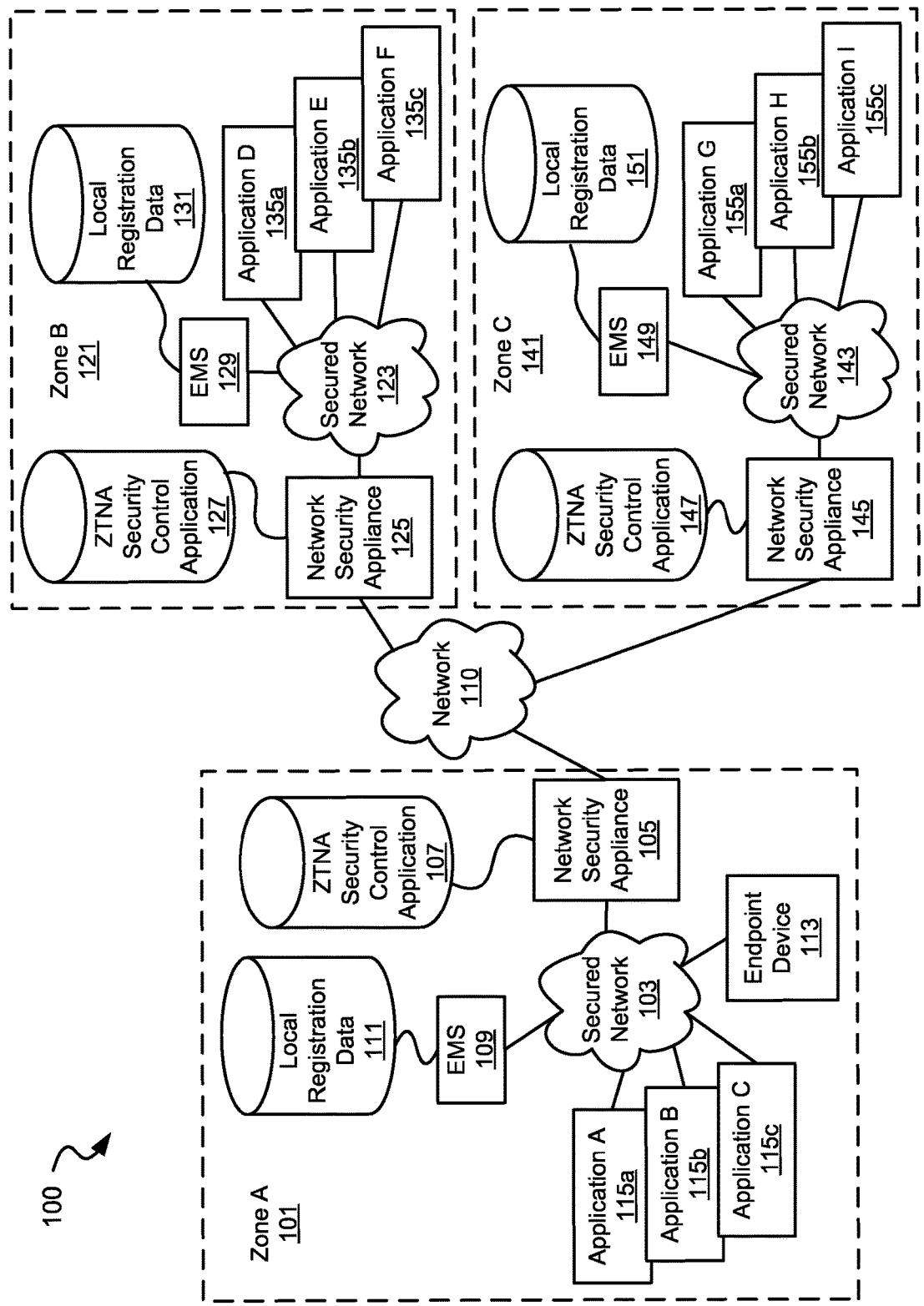
FIGS. 1A-1D illustrate a multi-zone network architecture having a plurality of local network zones that may each have separate ZTNA policies in accordance with some embodiments.

Various embodiments provide systems and methods for providing ZTNA control across multiple related, but independently provisioned networks.

As networks continue to grow it may become helpful to have separate local network zones that are each separately managed with differing degrees of network security that are under local control. In such a network topology each local network zone maintains is own: definitions for ZTNA (i.e., device posture), element management system (EMS), and network security appliance (e.g., FortiGate™). Such an environment allows for network security to be implemented and controlled on a smaller scale allowing for greater attention to threats relevant on a local level. Where ZTNA security is implemented in such an environment, an endpoint in one local network zone is precluded from accessing an application maintained in another local network zone because the endpoint is not identified to the local network zone where the application resides. Various embodiments discussed herein provide novel mechanisms allowing access by an endpoint in one local network zone to access an application maintained in another local network zone while adhering to the network security (e.g., ZTNA policy, trust certificates, and the like) of the local network zone maintaining the application.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for allowing access to applications in a multi-zone network. Such methods include: registering, by an endpoint device, with a first EMS, where the first EMS is configured to manage devices on a first local network zone; receiving, by the first endpoint device, a first trust certificate from the first EMS; identifying, by the first endpoint device, a resource accessible via a second local network zone; registering, by the endpoint device, with a second EMS, wherein the second EMS is configured to manage devices on a second local network zone, wherein the registering with the second EMS includes providing the first trust certificate; and receiving, by the first endpoint device, a second trust certificate from the second EMS, where the second trust certificate is provided by the second EMS based at least in part on the first trust certificate. In some instances of the aforementioned embodiments, the resource is an application.

In various instances of the aforementioned embodiments, identifying the resource accessible via the second local network zone includes: executing, by the endpoint device, a first application, wherein the first application requires access to a second application, wherein the resource is the second application; and determining, by the endpoint device, that the second application is not accessible via the first local network zone. In some such instances, determining that the second application is not accessible via the first local network zone is done based at least in part upon one or more of: an Internet Protocol address of the resource, domain name system lookup information for the resource, and/or an access control list for the first local network zone. In one or more such instances, identifying the resource accessible via the second local network zone further includes determining, by the endpoint device, that the second application is accessible via the second local network zone.

In some instances of the aforementioned embodiments, identifying the resource accessible via the second local network zone includes determining, by the endpoint device, that the resource is accessible via the second local network zone based at least in part upon accessing a list of resources. In one or more instances of the aforementioned embodiments, the methods further include accessing, by the endpoint device, the resource using the second trust certificate.

Other embodiments provide methods for allowing access to applications in a multi-zone network that include: receiving, by a first EMS configured to manage devices on a first local network zone, a registration request from an endpoint device, where the registration request includes a first trust certificate issued by a second EMS configured to manage devices on a second local network zone; issuing, by the first EMS, a second trust certificate to the endpoint device based at least in part on the first trust certificate; and identifying, by the first EMS, the endpoint device to a network security appliance governing access to the first local network zone. In some instances of the aforementioned embodiments, the methods further include terminating, by the first EMS, the second trust certificate based at least in part on expiration of a time period.

Yet other embodiments provide systems for allowing access to applications in a multi-zone network. Such systems include a processing resource and a non-transitory computer-readable medium. The non-transitory computer readable medium is coupled to the processing resource and has stored therein instructions that when executed by the processing resource cause the processing resource to: register with a first EMS, where the first EMS is configured to manage devices on a first local network zone; receive a first trust certificate from the first EMS; identify a resource accessible via a second local network zone; register with a second EMS, where the second EMS is configured to manage devices on a second local network zone, and where the registering with the second EMS includes providing the first trust certificate; and receive a second trust certificate from the second EMS, wherein the second trust certificate is provided by the second EMS based at least in part on the first trust certificate.

Yet further embodiments provide systems for allowing access to applications in a multi-zone network. Such systems include a processing resource and a non-transitory computer-readable medium. The non-transitory computer readable medium is coupled to the processing resource and has stored therein instructions that when executed by the processing resource cause the processing resource to: receive a registration request from an endpoint device, wherein the registration request includes a first trust certificate issued by an EMS configured to manage devices on a first local network zone; issue a second trust certificate to the endpoint device based at least in part on the first trust certificate; and identify the endpoint device to a network security appliance governing access to a second local network zone.

Yet additional embodiments provide non-transitory computer-readable storage media embodying a set of instructions, which when executed by a processing resource, causes the processing resource to: register with a first EMS, wherein the first EMS is configured to manage devices on a first local network zone; receive a first trust certificate from the first EMS; identify a resource accessible via a second local network zone; register with a second EMS, where the second EMS is configured to manage devices on a second local network zone, where the registering with the second EMS includes providing the first trust certificate; and receive a second trust certificate from the second EMS, wherein the second trust certificate is provided by the second EMS based at least in part on the first trust certificate.

Turning to FIG. 1A, a multi-zone network architecture 100 is shown in accordance with some embodiments. As shown, multi-zone network architecture 100 has a plurality of local network zones (i.e., zone A 101, zone B 121, and zone C 141). Each of the local network zones are communicably coupled via a network 110. Network 110 may be any communication systems or collection of communication systems that provide for network communications between respective networks. Those skilled in the art will appreciate that, network 110 can be a wireless network, a wired network or a combination thereof that can be implemented as one of the various types of networks, such as the Internet, an Intranet, a Local Area Network (LAN), a Wide Area Network (WAN), and the like.

Each local network zone includes a number of network elements communicatively coupled via a secured network (i.e., secured network 103, secured network 123, and secured network 143). Secured network 102 may be any type of communication network known in the art. Those skilled in the art will appreciate that, secured network 102 can be a wireless network, a wired network or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Each of the local network zones includes at least one dedicated EMS (i.e., EMS 109, EMS 129, and EMS 149) that maintains a local registration database (i.e., local registration data 111, local registration data 131, and local registration data 151). Such EMS systems may be any EMS system known in the art. Based upon the disclosure provided herein, one of ordinary skill in the art will recognize a variety of EMS systems that may be used in relation to different embodiments.

In addition, each of the local network zones may include one or more applications (i.e., application A 115a, application B 115b, and application C 115c in zone A 101; application D 135a, application E 135b, and application F 135c in zone B 121; and application G 155a, application H 155b, and application I 155c in zone A 141). Some of the applications in one local network zone may be the same applications that are also maintained in another local network zone, and some of the applications may only be maintained in one local network zone. Such applications may be any applications known in the art. Based upon the disclosure provided herein, one of ordinary skill in the art will recognize a variety of applications that may be maintained on one or more local network zone in accordance with different embodiments.

Each local network zone additionally includes one or more network security appliances or devices (i.e., network security appliance 105, network security appliance 125, and network security appliance 135). Such network appliances execute a ZTNA security control application (e.g., ZTNA security control application 107, ZTNA security control application 127, and ZTNA security control application 147) that provides for selectively allowing access to network elements coupled to a secured network of a respective local network zone based upon security policies implemented for the local network zone. Such network security appliances may be any network security appliance known in the art that is capable of selectively allowing access to network elements coupled to a secured network of a respective local network zone based upon security policies implemented for the local network zone. Based upon the disclosure provided herein, one of ordinary skill in the art will recognize a variety of network security appliances that may be used in relation to different local network zones and/or in relation to different embodiments.

One or more endpoint devices 113 may be connected to a secured network of a local network zone. Such endpoint devices 113 are registered with the EMS of the local network zone. It is noted that while endpoint device 113 is shown as connected to network 110 via network security appliance 105, in other embodiments endpoint device 113 may be directly connected to network 110. Further discussion of endpoint device 113 is provided in relation to FIG. 1B below.

Figure 1B:
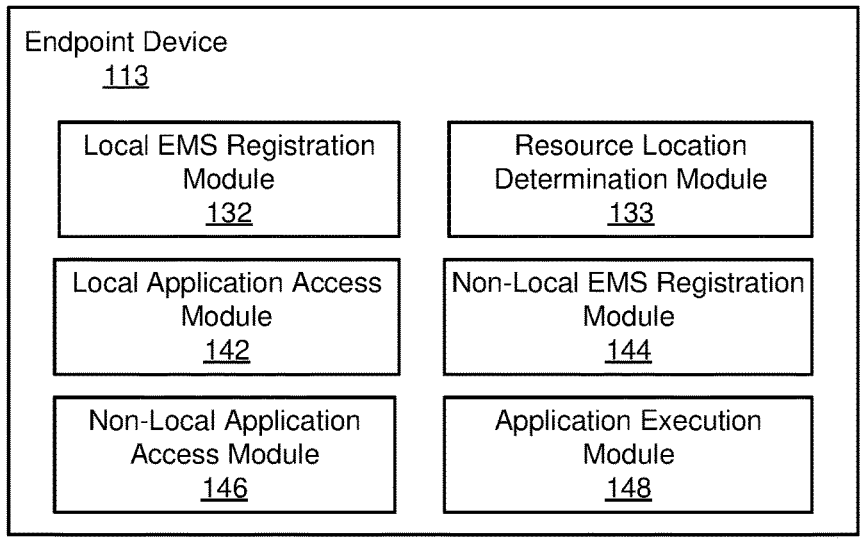

Turning to FIG. 1B, an implementation of endpoint device 113 is shown in accordance with some embodiments. In this embodiment, endpoint device 113 includes a local EMS registration module 132, a resource location determination module 133, a local application access module 142, a non-local EMS registration module 144, a non-local application access module 146, and an application execution module 148.

Local EMS registration module 132 is configured to register endpoint device 113 with an EMS. To do this, when endpoint device 113 comes online in a particular zone of the network (e.g., zone A 101), local EMS registration module 132 is executed to register with the EMS of that particular zone as a default. This registration with the EMS for the zone results in issuance of a trust certificate with the endpoint device can use to access applications behind the network security appliance for that particular zone. Using network architecture 100 as an example, endpoint device 113 accesses EMS 109 via secured network 103. EMS 109 processes a request for registration on network 103 and upon successful registration updates local registration data 111 to indicate that endpoint device 113 is allowed to access at least a subset of network elements in zone A 101. Additionally, EMS 109 issues a trust certificate to endpoint device 113 that is stored local to endpoint device 113, and provides an update to network security appliance 105 indicating the permissions granted to endpoint device 113 within zone A 101. Various processes of requesting a trust certificate, registering endpoint device 113 with EMS 109, issuing the trust certificate to endpoint device 113, and updating network security appliance 105 are well known in the art. Based upon the disclosure provided herein, one of ordinary skill in the art will recognize a variety of different processes that may be used in relation to different embodiments to obtain a trust certificate for a local network zone to which an endpoint device is to be registered.

Resource location determination module 133 is configured to determine whether a resource (e.g., an application) needed by endpoint device 113 is available within the local network zone on which endpoint device 113 is registered. This determination may be made in a variety of ways. In some embodiments, endpoint devices may be configured to execute an algorithm that determines whether an application is local or non-local based on, for example, Internet Protocol (IP) address ranges, Domain Name System (DNS) lookup information, and/or by accessing an Access Control List (ACL) for the zone in which the endpoint device is registered. Based upon the disclosure provided herein, one of ordinary skill in the art will recognize a variety of algorithms that may be executed by the endpoint device to determine whether an application is local or non-local.

Local application access module 142 is configured is configured to access a resource locally where it is determined that the resource is available within the local network zone on which endpoint device 113 is registered. Application execution module 148 is configured to use the resource whether it is been found locally. To do this, application execution module 148 uses a trust certificate issued to endpoint device 113 for the local network zone where the resource was found.

Non-local EMS registration module 144 is configured to register with another EMS (e.g., EMS 129) that services a local network zone (e.g., zone B 121) on which an identified resource is located. In some embodiments, the request for registration includes communicating the endpoint device trust certificate that was granted by the EMS on the local network zone to which the endpoint device is connected.

The endpoint device is not really requesting permission to use a particular application, but rather is registering with an EMS that is in the network zone local to the application that the endpoint device wants to access. The EMS performs a full posture check and based upon this full posture check whatever ZTNA functions for that particular zone of the network are applied.

Non-local application access module 146 is configured to access a resource using a trust certificate for a local network zone in which the resource is located. This access is made via the network security appliance in the local network zone where the application is maintained. To make this work, the EMS of the local network zone in which the application is maintained updates the network security appliance to indicate the granted access, and the network security appliance updates any ZTNA policies germane to the application to allow access by the newly identified endpoint device. Thus, when the endpoint accesses the application the network security appliance allows the network traffic associated with the access to proceed. Thus, the use of the trust certificate is enabled by standard communications between the EMS and the network security appliance, and does not require any non-standard operation on the part of the endpoint device. As set forth above, application execution module 148 is configured to use the resource whether it is been found locally.

Figure 1C:
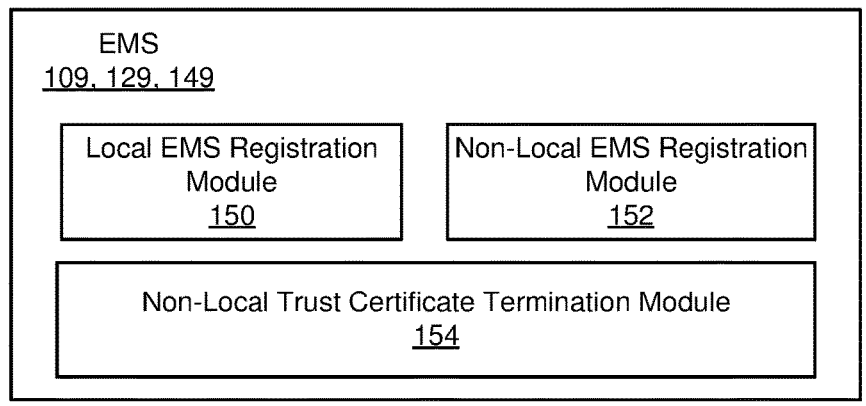

Turning to FIG. 1C, an implementation of at least one of EMS 109, EMS 129, and/or EMS 149 is shown in accordance with some embodiments. In this embodiment, EMS 109, 129, 149 include a local EMS registration module 150, a non-local EMS registration module 152, and a non-local trust certificate termination module 154. Local EMS registration module 150 performs registrations for endpoint devices operating on the local network zone that is serviced by the EMS device. Such local registration may be done consistent with any know approach for registering an endpoint device and providing a trust certificate that is known in the art. Non-local EMS registration module 152 is configured to register an endpoint device based at least in part on a trust certificate issued to the endpoint device by an EMS servicing another local network zone. Non-local trust certificate termination module 154 is configured to terminate a trust certificate issued by non-local EMS registration module 152 based upon configuration rules set by a network administrator.

Figure 1D:
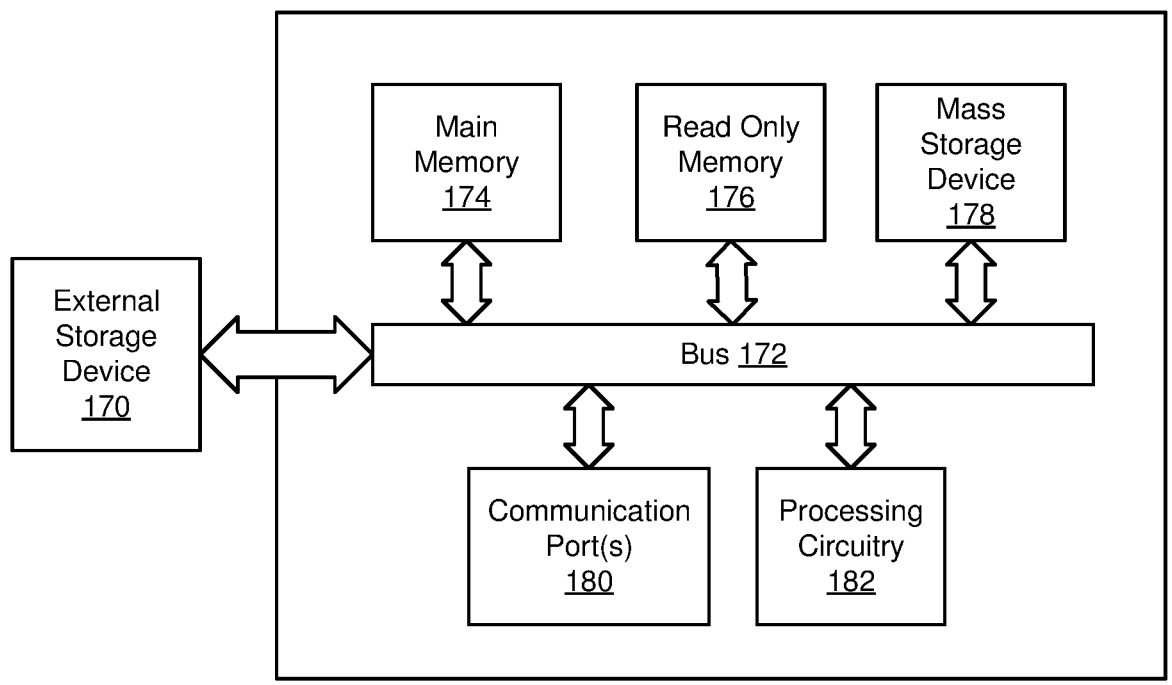

Turning to FIG. 1D, an example computer system 160 is shown in which or with which embodiments of the present disclosure may be utilized. As shown in FIG. 1D, computer system 160 includes an external storage device 170, a bus 172, a main memory 174, a read-only memory 176, a mass storage device 178, one or more communication ports 1010, and one or more processing resources (e.g., processing circuitry 182). In one embodiment, computer system 160 may represent some portion of security orchestration system 120, network security appliance 115, one or more computers on which applications A 110, application B 111, and/or application C 112 are executing, and/or one or more network servers governing database A 106, database B 107, and/or database C 108.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc—Read Only Memory (CD-ROM), Compact Disc—Rewritable (CD-RW), Digital Video Disk—Read Only Memory (DVD-ROM). Components described above are meant only to show various possibilities. In no way should the aforementioned example computer system limit the scope of the present disclosure.

Figure 2:
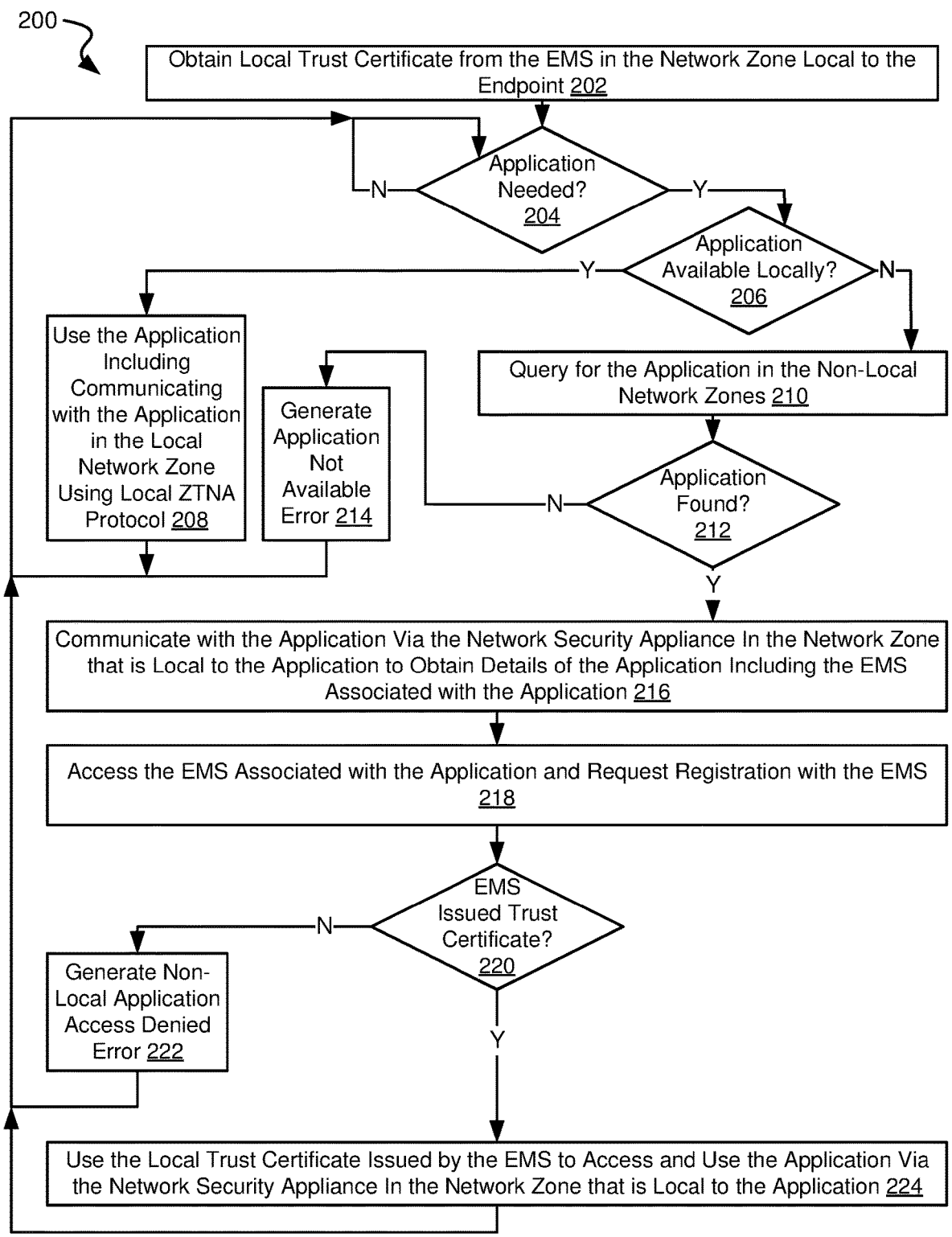
FIG. 2 is a flow diagram showing a method in accordance with various embodiments for allowing network access across local network zones that each have separate ZTNA policies from the perspective of an endpoint.

Turning to FIG. 2, a flow diagram 200 shows a method in accordance with various embodiments for allowing network access across local network zones that each have separate ZTNA policies. Following flow diagram 200, an endpoint device obtains a trust certificate from an EMS in the local network zone for the endpoint device (block 202). To do this, when the endpoint device comes online in a particular zone of the network (e.g., zone A 101), the endpoint device registers with the EMS of that particular zone as a default. This registration with the EMS for the zone results in issuance of a trust certificate with the endpoint device can use to access applications behind the network security appliance for that particular zone. Using network architecture 100 as an example, endpoint device 113 accesses EMS 109 via secured network 103. EMS 109 processes a request for registration on network 103 and upon successful registration updates local registration data 111 to indicate that endpoint device 113 is allowed to access at least a subset of network elements in zone A 101. Additionally, EMS 109 issues a trust certificate to endpoint device 113 that is stored local to endpoint device 113, and provides an update to network security appliance 105 indicating the permissions granted to endpoint device 113 within zone A 101. Various processes of requesting a trust certificate, registering endpoint device 113 with EMS 109, issuing the trust certificate to endpoint device 113, and updating network security appliance 105 are well known in the art. Based upon the disclosure provided herein, one of ordinary skill in the art will recognize a variety of different processes that may be used in relation to different embodiments to obtain a trust certificate for a local network zone to which an endpoint device is to be registered.

Using the aforementioned trust certificate, the endpoint device is able to access a subset of network elements coupled to the secured network of local network zone. This may include, but is not limited to, applications maintained in the local network zone. Thus, again using network architecture 100 as an example, the trust certificate issued to endpoint device 113 may be used to obtain access to one or more of application A 115a, application B 115b, and/or application C 115c located in zone A 101. Various processes for using the trust certificate to access network elements in the local network zone are well known in the art. Based upon the disclosure provided herein, one of ordinary skill in the art will recognize a variety of different processes that may be used in relation to different embodiments to use a trust certificate to access network elements in the local network zone including the EMS from which the trust certificate was issued.

When operating, the endpoint device determines whether it needs access to a particular application (block 204). Thus, as an example, the endpoint device may be plotting a course of travel and in so doing needs access to a mapping application. Based upon the disclosure provided herein, one of ordinary skill in the art will recognize a variety of applications that operation of an endpoint device may demand.

Where a particular application is identified by the endpoint device as needed (block 204), the endpoint device determines whether the application is available within the local network zone on which the endpoint device is operating (block 206). This determination may be made in a variety of ways. In some embodiments, endpoint devices may be configured to execute an algorithm that determines whether an application is local or non-local based on, for example, Internet Protocol (IP) address ranges, Domain Name System (DNS) lookup information, and/or by accessing an Access Control List (ACL) for the zone in which the endpoint device is registered. Based upon the disclosure provided herein, one of ordinary skill in the art will recognize a variety of algorithms that may be executed by the endpoint device to determine whether an application is local or non-local.

As another example, in some embodiments, a global authority may maintain a list of all applications operating within related local network zones (e.g., zone A 101, zone B 121, and zone C 131), and may push a list of applications and their respective locations (e.g., uniform record locators (URLs)) to each endpoint device registered on any of the related local network zones. In such a case, determining whether the particular application desired by the endpoint device is done by the endpoint device accessing the locally stored application list and obtaining the location of the particular application, and from there determining whether the location is within the local network zone on which the endpoint device is operating, Such a process requires a global authority monitor the availability and location of all applications accessible on any of the related local network zones and to update the list to all endpoints. This can be a cumbersome process as the availability of a given local network zone may come and go, the availability of a given application on a local network zone may come and go, and endpoint devices on related local network zones may come and go.

To reduce the cumbersome nature of aforementioned approach of storing the application list local to each endpoint device, in other embodiments the same global authority may distribute the application list to a local oracle device within each local network zone. Such an oracle device may be, for example, the network security appliance or the EMS of the local network zone, or to another designated network element in the local network zone. In such a scenario, determining whether the particular application desired by the endpoint device is done by the endpoint device accessing the application list from the local oracle device, and from there determining whether the location is within the local network zone on which the endpoint device is operating. Such an approach relieves the need to actively push the application list to endpoint devices which may come and go, but still requires the global authority monitor the availability and location of all applications accessible on any of the related local network zones and to update the list to all endpoints. As with the previously approach, this can be a cumbersome process as the availability of a given local network zone may come and go, and the availability of a given application on a local network zone may come and go.

To reduce the cumbersome nature of aforementioned approach of storing the application list to local oracle devices within each local network zone, in various embodiments responsibility for maintaining a list of applications within each local network zone may fall to a local authority. This local application list is then updated to the local oracle device along with a list of local oracles from each related local network zone on which a local application list for the respective local network zone is maintained. In such a scenario, determining whether the particular application desired by the endpoint device is done by the endpoint device accessing the local application list from the local oracle device and the list of local oracles for each of the related local network zones. Where the application is not available within the local network zone on which the endpoint device is operating, the endpoint device would have the responsibility of querying the each of the local oracles on the related local network zones until the application is found to identify the location of the application. Such an approach allows for application accounting at a local network zone level, but requires more sophistication on the part of the endpoint device to query multiple local oracles to determine an application location. Further, the local authority for each local network zone is responsible for maintaining an updated list of local oracles on related local network zones. Based upon the disclosure provided herein, one of ordinary skill in the art will recognize a variety of approaches that may be used in relation to different embodiments to identify the availability and location of a particular application within one of a number of related local network zones.

Where the application is identified as available on the local network zone on which the endpoint device is operating (block 206), the application is accesses and used locally using the trust certificate issued by the EMS operating on the same local network zone on which the endpoint device is operating (block 208). This includes the endpoint device communicating directly with the identified application in accordance with the ZTNA protocol particular local network zone. Such a process of accessing and using a local application is well known in the art.

Alternatively, where the application is identified as not available on the local network zone on which the endpoint device is operating (block 206), the endpoint device queries as to the availability and location of the application on one or more related local network zones (block 210). This may be done using any of the approaches described above for identifying availability and location of an application. Where the application is not available (i.e., not found) on any of the related local network zones (block 212), an application not available error message is generated internal to the endpoint device (block 214).

Alternatively, where the application is identified as not available on the local network zone on which the endpoint device is operating (block 206), the endpoint device communicates directly with the identified application using the obtained application location information via the network security appliance in the local network zone in which the application is maintained (block 216). This access to the application yields details about the application including the EMS of the local network zone one which the application is maintained.

Having identified the particular EMS responsible for the application, the endpoint device requests registration with the EMS identified by the application (block 218). In some embodiments, the request for registration includes communicating the endpoint device trust certificate that was granted by the EMS on the local network zone to which the endpoint device is connected. The endpoint device is not really requesting permission to use a particular application, but rather is registering with an EMS that is in the network zone local to the application that the endpoint device wants to access. The EMS performs a full posture check and based upon this full posture check whatever ZTNA functions for that particular zone of the network are applied.

The EMS local to the application desired by the endpoint device (e.g., EMS 129 where application D 135a is desired by endpoint device 113) implements various rules for determining which endpoint devices may be recognized for purposes of accessing applications on the local network zone serviced by the EMS. Where, for example, the EMS rules grant access to any endpoint device previously registered on any of an enumerated list of local network zones (e.g., zone A 101, zone B 121, or zone C 141), presentation of a trust certificate issued from an EMS of one of the enumerated list of local network zones to the EMS implementing the rules will result in the EMS issuing a trust certificate to the requesting endpoint device. In such a scenario, the endpoint device will have multiple trust certificates (i.e., at least the trust certificate from the EMS with which the endpoint device originally registered, and the trust certificate from another local network zone that was issued based at least in part on the originally issued trust certificate).

In other embodiments, the request to register with the EMS may be done based upon rules which do not rely upon a trust certificate issued by an EMS for another local network zone. In such circumstances, the EMS implements rules which recognize endpoint devices that may be operating in another local network zone as if they are native to the local network zone serviced by the EMS. Based upon the disclosure provided herein, one of ordinary skill in the art will recognize a variety of rules that may be implemented by an EMS that is not local to the endpoint device for determining whether to grant a trust certificate to the endpoint device.

The endpoint device determines whether the EMS of the local network zone of the application provided a trust certificate in response to the request to register with the EMS (block 220). Where a trust certificate was not provided (block 220), a non-local application access denied error is generated internal to the endpoint device (block 222).

Alternatively, where a trust certificate was provided by the EMS of the local network zone of the application (block 220), the endpoint device accesses the application using the trust certificate for the local network zone in which the application is maintained (block 224). This access is made via the network security appliance in the local network zone where the application is maintained. To make this work, the EMS of the local network zone in which the application is maintained updates the network security appliance to indicate the granted access, and the network security appliance updates any ZTNA policies germane to the application to allow access by the newly identified endpoint device. Thus, when the endpoint accesses the application the network security appliance allows the network traffic associated with the access to proceed. Thus, the use of the trust certificate is enabled by standard communications between the EMS and the network security appliance, and does not require any non-standard operation on the part of the endpoint device.

In some embodiments, the grant of access (i.e., the issued trust certificate) is temporary and upon expiration of a timeout period, the grant of access to the application by the endpoint device afforded by the trust certificate is rescinded. Such a rescinding of the grant is done by removing the grant from the EMS, and in turn the EMS updating the network security appliance to reflect the rescission in the ZTNA policies germane to the application. After such a timeout period, the endpoint device would have to renew its ability to access the application using the processes of blocks 204-224 as discussed above.

Figure 3:
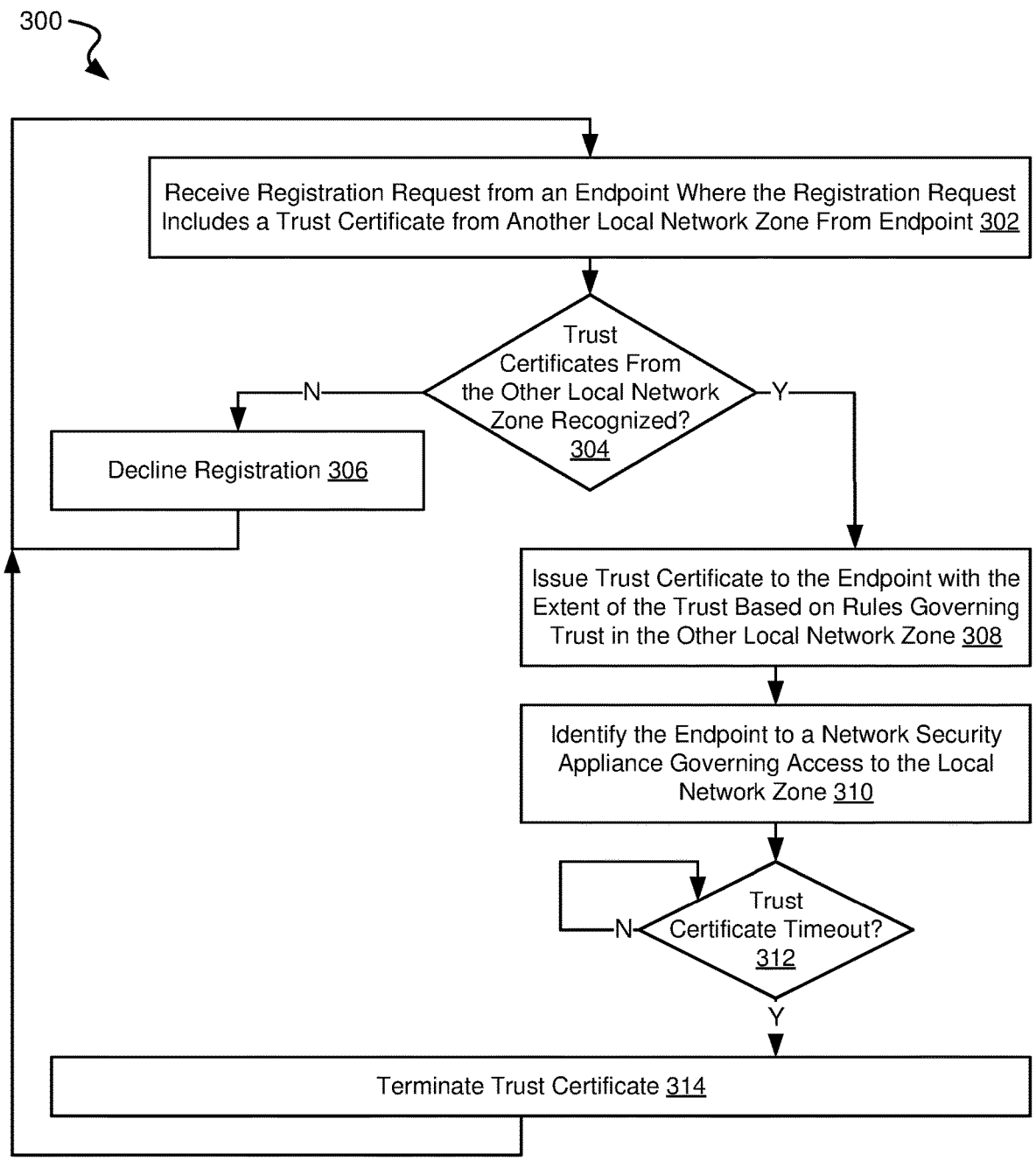
FIG. 3 is a flow diagram showing a method in accordance with various embodiments for allowing network access across local network zones that each have separate ZTNA policies from the perspective of an EMS.

Turning to FIG. 3, a flow diagram 300 shows a method in accordance with various embodiments for allowing network access across local network zones that each have separate ZTNA policies from the perspective of an EMS. Following flow diagram 300, a registration request is received from an endpoint (block 302). The endpoint has previously registered with an EMS from another local network zone (e.g., zone A 101) and has been granted a trust certificate valid for the other local network zone. The endpoint provides the trust certificate for the other local network zone to the EMS in the local network zone with which the endpoint is now trying requesting registration. Thus, using FIG. 1A as an example, endpoint device 113 previously registered with EMS 109 and is issued a trust certificate. Endpoint device 113 then requests registration with EMS 129, and as part of the request provides the trust certificate issued by EMS 109.

The EMS receiving the trust certificate issued by an EMS for another local network zone determines whether trust certificates for the other local network zone are recognized (block 304). A network administrator may set one or more rules on which trust certificates are honored. For example, an EMS may recognize all trust certificates issued by local network zones identified on an enumerated list, but only for a short period of time. Based upon the disclosure provided herein, one of ordinary skill in the art will recognize a variety of rules for recognizing trust certificates from other local network zones that may be implemented in relation to different embodiments.

Where the EMS determines that it does not recognize the trust certificate provided by the endpoint (block 304), registration is declined and the EMS does not issue another trust certificate to the endpoint (block 306). This denial may or may not be provided to the endpoint depending upon the particular implementation.

Alternatively, where the EMS determines that it does recognize the trust certificate provided by the endpoint (block 304), the EMS issues a trust certificate to the requesting endpoint (block 308). As such, the endpoint has another trust certificate in addition to the trust certificate issued in relation to the other local network zone. As an example, endpoint device 113 using a trust certificate issued by EMS 109 to request registration with EMS 129 would have a trust certificate issued by EMS 129 in addition to the trust certificate previously issued by EMS 109.

The scope of the trust certificate issued based upon the previously issued trust certificate from another local network zone is based upon rules governing trust in the other local network zone. A network administrator defines the aforementioned rules that are implemented by the EMS receiving the request for registration. Using the previous example, the rule may allow for issuing a trust certificate, but that trust certificate is limited to a certain time, and after expiration of the time period the EMS revokes or terminates the trust certificate.

In addition, the EMS issuing the trust certificate identifies the endpoint to a network security appliance governing access to the local network zone serviced by the EMS (block 310). This may include performing any process necessary to assure the endpoint can access resources on the local network zone consistent with the scope of the newly issued trust certificate.

Where the issued trust certificate is valid for only defined time period, the EMS that issued the trust certificate monitors the timeout condition (block 312). Once the timeout condition is met (block 312), the EMS terminates the trust certificate (block 314). At this juncture, the endpoint is no longer granted access to resources on the local network zone, and to the extent further access is desired, the endpoint must re-register with the EMS and again provide the trust certificate from the other local network zone.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method comprising:
  registering an endpoint device with a first element management system (EMS) in a local network zone of a zero-trust network access (ZTNA) multi-zone network architecture;
  receiving, by the endpoint device from the first EMS, a first trust certificate allowing the endpoint device to access one or more applications over a local secure network within the local network zone;
  determining a need to access a selected application and a location of the selected application in the ZTNA multi-zone network architecture, the selected application being one of the one or more applications accessible over the local secure network within the local network zone of the ZTNA multi-zone network architecture or an application accessible over a non-local secure network within a non-local network zone of the ZTNA multi-zone network architecture, the local secure network being coupled to the non-local secure network;
  in response to determining the location of the selected application is within the local network zone, using the first trust certificate to access the selected application according to a first ZTNA security protocol over the local secure network for the local network zone; and
  in response to determining the location of the selected application is not within the local network zone, determining a non-local network zone of the ZTNA multi-zone network architecture including the selected application and determining availability of the selected application within the non-local network zone, in response to the selected application being available in the non-local network zone, registering the endpoint device with a second EMS in the non-local network zone using the first trust certificate, receiving, by the endpoint device from the second EMS, a second trust certificate allowing the endpoint device to access the selected application within the non-local network zone, the second trust certificate being based at least in part on the first trust certificate, and using the second trust certificate to access the selected application according to a second ZTNA security protocol over the non-local secure network for the non-local network zone.

2. The method of claim 1, comprising storing at least one of the first trust certificate and the second trust certificate on the endpoint device.

3. The method of claim 1, comprising updating a local network security device, coupled to the local secure network, indicating allowability of the endpoint device to access the one or more applications over the local secure network within the local network zone according to the first trust certificate.

4. The method of claim 1, comprising updating a non-local network security device, coupled to the non-local secure network, indicating allowability of the endpoint device to access the selected application over the non-local secure network within the non-local network zone according to the second trust certificate.

5. The method of claim 1, wherein determining the location of the selected application comprises determining a network zone within the ZTNA multi-zone network architecture including the selected application based at least in part on Internet Protocol address ranges for the local network zone.

6. The method of claim 1, wherein determining the location of the selected application comprises determining a network zone within the ZTNA multi-zone network architecture including the selected application based at least in part on domain name lookup information for the local network zone.

7. The method of claim 1, wherein determining the location of the selected application comprises determining a network zone within the ZTNA multi-zone network architecture including the selected application based at least in part on an access control list for the local network zone.

8. The method of claim 1, wherein determining the location of the selected application comprises accessing an application list received from a global authority and stored on the endpoint device, the application list including network zones of the ZTNA multi-zone network architecture including the one or more applications, the one or more applications including the selected application.

9. The method of claim 1, wherein determining the location of the selected application comprises accessing an application list received from a global authority and stored in at least one of the first EMS in the local network zone, the application list including network zones of the ZTNA multi-zone network architecture including the one or more applications, the one or more applications including the selected application.

10. The method of claim 1, wherein determining the location of the selected application comprises accessing an application list maintained by in the local network zone, the application list including network zones of the ZTNA multi-zone network architecture including the one or more applications, the one or more applications including the selected application, wherein the application list is maintained in the local network zone by querying the second EMS in the non-local network zone as to applications accessible in the non-local network zone.

11. The method of claim 1, wherein registering the endpoint device with the second EMS in the non-local network zone comprises identifying the endpoint device as native to the non-local network zone according to one or more rules in place of registering the endpoint device with the second EMS in the non-local network zone using the first trust certificate.

12. A system comprising:
a processing resource;
a non-transitory computer-readable medium, coupled to the processing resource, having stored therein instructions that when executed by the processing resource cause the processing resource to:
register an endpoint device with a first element management system (EMS) in a local network zone of a zero-trust network access (ZTNA) multi-zone network architecture;
receive, by the endpoint device from the first EMS, a first trust certificate allowing the endpoint device to access one or more applications over a local secure network within the local network zone;
determine a need to access a selected application and a location of the selected application in the ZTNA multi-zone network architecture, the selected application being one of the one or more applications accessible over the local secure network within the local network zone of the ZTNA multi-zone network architecture or an application accessible over a non-local secure network within a non-local network zone of the ZTNA multi-zone network architecture, the local secure network being coupled to the non-local secure network;
in response to determining the location of the selected application is within the local network zone, use the first trust certificate to access the selected application according to a first ZTNA security protocol over the local secure network for the local network zone; and
in response to determining the location of the selected application is not within the local network zone, determine a non-local network zone of the ZTNA multi-zone network architecture including the selected application and determining availability of the selected application within the non-local network zone, in response to the selected application being available in the non-local network zone, register the endpoint device with a second EMS in the non-local network zone using the first trust certificate, receive, by the endpoint device from the second EMS, a second trust certificate allowing the endpoint device to access the selected application within the non-local network zone, the second trust certificate being based at least in part on the first trust certificate, and use the second trust certificate to access the selected application according to a second ZTNA security protocol over the non-local secure network for the non-local network zone.

13. The system of claim 12, comprising instructions to store at least one of the first trust certificate and the second trust certificate on the endpoint device.

14. The system of claim 12, comprising instructions to update a local network security device, coupled to the local secure network, indicating allowability of the endpoint device to access the one or more applications over the local secure network within the local network zone according to the first trust certificate.

15. The system of claim 12, comprising instructions to update a non-local network security device, coupled to the non-local secure network, indicating allowability of the endpoint device to access the selected application over the non-local secure network within the non-local network zone according to the second trust certificate.

16. The system of claim 12, wherein instructions to determine the location of the selected application comprise instructions to determine a network zone within the ZTNA multi-zone network architecture including the selected application based at least in part on Internet Protocol address ranges for the local network zone.

17. The system of claim 12, wherein instructions to determine the location of the selected application comprise instructions to determine a network zone within the ZTNA multi-zone network architecture including the selected application based at least in part on domain name lookup information for the local network zone.

18. The system of claim 12, wherein instructions to determine the location of the selected application comprise instructions to determine a network zone within the ZTNA multi-zone network architecture including the selected application based at least in part on an access control list for the local network zone.

19. The system of claim 12, wherein instructions to determine the location of the selected application comprise instructions to access an application list received from a global authority and stored on the endpoint device, the application list including network zones of the ZTNA multi-zone network architecture including the one or more applications, the one or more applications including the selected application.

20. The system of claim 12, wherein instructions to determine the location of the selected application comprise instructions to access an application list received from a global authority and stored in at least one of the first EMS in the local network zone, the application list including network zones of the ZTNA multi-zone network architecture including the one or more applications, the one or more applications including the selected application.

21. The system of claim 12, wherein instructions to determine the location of the selected application comprise instructions to access an application list maintained by in the local network zone, the application list including network zones of the ZTNA multi-zone network architecture including the one or more applications, the one or more applications including the selected application, wherein the application list is maintained in the local network zone by querying the second EMS in the non-local network zone as to applications accessible in the non-local network zone.

22. The system of claim 12, wherein instructions to register the endpoint device with the second EMS in the non-local network zone comprise instructions to identify the endpoint device as native to the non-local network zone according to one or more rules in place of registering the endpoint device with the second EMS in the non-local network zone using the first trust certificate.

23. A non-transitory computer-readable storage medium embodying a set of instructions, which when executed by a processing resource, causes the processing resource to:
  register an endpoint device with a first element management system (EMS) in a local network zone of a zero-trust network access (ZTNA) multi-zone network architecture;
  receive, by the endpoint device from the first EMS, a first trust certificate allowing the endpoint device to access one or more applications over a local secure network within the local network zone;
  determine a need to access a selected application and a location of the selected application in the ZTNA multi-zone network architecture, the selected application being one of the one or more applications accessible over the local secure network within the local network zone of the ZTNA multi-zone network architecture or an application accessible over a non-local secure network within a non-local network zone of the ZTNA multi-zone network architecture, the local secure network being coupled to the non-local secure network;
  in response to determining the location of the selected application is within the local network zone, use the first trust certificate to access the selected application according to a first ZTNA security protocol over the local secure network for the local network zone; and
  in response to determining the location of the selected application is not within the local network zone, determine a non-local network zone of the ZTNA multi-zone network architecture including the selected application and determining availability of the selected application within the non-local network zone, in response to the selected application being available in the non-local network zone, register the endpoint device with a second EMS in the non-local network zone using the first trust certificate, receive, by the endpoint device from the second EMS, a second trust certificate allowing the endpoint device to access the selected application within the non-local network zone, the second trust certificate being based at least in part on the first trust certificate, and use the second trust certificate to access the selected application according to a second ZTNA security protocol over the non-local secure network for the non-local network zone.

24. The non-transitory computer-readable storage medium of claim 23, embodying a set of instructions, which when executed by a processing resource, causes the processing resource to:
  update a local network security device, coupled to the local secure network, indicating allowability of the endpoint device to access the one or more applications over the local secure network within the local network zone according to the first trust certificate.

25. The non-transitory computer-readable storage medium of claim 23, embodying a set of instructions, which when executed by a processing resource, causes the processing resource to:
  update a non-local network security device, coupled to the non-local secure network, indicating allowability of the endpoint device to access the selected application over the non-local secure network within the non-local network zone according to the second trust certificate.

* * * * *